United States Patent [19]

Hasz et al.

[11] Patent Number: 5,851,678
[45] Date of Patent: Dec. 22, 1998

[54] COMPOSITE THERMAL BARRIER COATING WITH IMPERMEABLE COATING

[75] Inventors: Wayne Charles Hasz, Pownal, Vt.; Marcus Preston Borom, Niskayuna; Curtis Alan Johnson, Schenectady, both of N.Y.

[73] Assignee: General Electric Company, Schenectady, N.Y.

[21] Appl. No.: 630,337

[22] Filed: Apr. 11, 1996

Related U.S. Application Data

[63] Continuation of Ser. No. 417,580, Apr. 6, 1995, abandoned.

[51] Int. Cl.$^6$ ..................................................... B32B 15/04
[52] U.S. Cl. ........................... 428/469; 428/471; 428/472; 428/689; 428/698; 428/701; 428/702
[58] Field of Search ..................................... 428/469, 471, 428/472, 688, 689, 698, 701, 702, 551, 552, 632, 633, 660, 672, 673

[56] References Cited

U.S. PATENT DOCUMENTS

| | | | |
|---|---|---|---|
| 4,399,199 | 8/1983 | McGill | 428/633 |
| 4,676,994 | 6/1987 | Demaray | 427/42 |
| 4,996,117 | 2/1991 | Chu | 428/633 |
| 5,080,977 | 1/1992 | Zaplatynsky | 428/432 |

OTHER PUBLICATIONS

"Fatigue of Thick Thermal Barrier Coatings", KF Wesling, et al., J. Am. Ceram. Soc., 77(7) pp. 1863–1868 (1994).

"Degradation of Thermal–Barrier Coatings at Very High Temperatures", FH Stott, et al., MRS Bulletin, pp. 46–50, Oct. 1994.

*Primary Examiner*—Timothy M. Speer
*Attorney, Agent, or Firm*—Noreen C. Johnson; Douglas E. Stoner

[57] ABSTRACT

A composite that protects thermal barrier coatings on parts from the deleterious effects of environmental contaminants at operating temperatures with an impermeable barrier coating is divulged. The thermal barrier coating composite decreases infiltration of molten contaminant compositions into openings in the thermal barrier coating to increase the life of the composite.

5 Claims, No Drawings

COMPOSITE THERMAL BARRIER COATING WITH IMPERMEABLE COATING

This application is a Continuation of application Ser. No. 08/417,580 filed Apr. 6, 1995, now abandoned.

FIELD OF THE INVENTION

The present invention relates to a composite that protects thermal barrier coatings at operating temperatures from degradation caused by environmeantal contaminants. More specifically, the invention relates to the use of an impermeable coating on a thermal barrier coating, where the impermeable coating reduces infiltration of liquid contaminant compositions into the thermal barrier coatings.

BACKGROUND OF THE INVENTION

Thermal barrier coatings are deposited onto gas turbine and other heat engine parts to reduce heat flow and to limit the operating temperature of metal parts. These coatings generally are a ceramic material, such as chemically stabilized zirconia. Yttria-stabilized zirconia, scandia-stabilized zirconia, calcia-stabilized zirconia, and magnesia-stabilized zirconia are contemplated as thermal barrier coatings. The thermal barrier coating of choice is a yttria-stabilized zirconia ceramic coating. A typical thermal barrier coating comprises about 8 weight percent yttria-92 weight percent zirconia. The thickness of a thermal barrier coating depends on the application, but generally ranges between about 5–60 mils thick for high temperature engine parts.

Metal parts provided with thermal barrier coatings can be made from nickel, cobalt, and iron based superalloys. The process is especially suited for parts and hardware used in turbines. Examples of turbine parts would be turbine blades, buckets, nozzles, combustion liners, and the like.

Thermal barrier coatings are a key element in current and future gas turbine engine designs expected to operate at high temperatures which produce high thermal barrier coating surface temperatures. The ideal system for a hot high temperature engine part consists of a strain-tolerant thermal barrier ceramic layer deposited onto a bond coat which exhibits good corrosion resistance and closely matched thermal expansion coefficients.

Under service conditions, thermal barrier coated engine parts can be susceptible to various modes of damage, including erosion, oxidation, and attack from environmental contaminants. At temperatures of engine operation adherence of these environmental contaminants on the hot thermal barrier coated surface can cause damage to the thermal barrier coating. Environmental contaminants form compositions, which are liquid at the surface temperatures of thermal barrier coatings.

Chemical and mechanical interactions occur between the contaminant compositions and the thermal barrier coatings. Molten contaminant compositions can dissolve the thermal barrier coating or can infiltrate its pores and openings, initiating and propagating cracks causing delamination and loss of thermal barrier coating material.

Some environmental contaminant compositions that deposit on thermal barrier coated surfaces contain oxides of calcium, magnesium, aluminum, silicon, and mixtures thereof. These oxides combine to form contaminant compositions comprising calcium-magnesium-aluminum-silicon-oxide systems (Ca—Mg—Al—SiO), herein referred to as CMAS. Damage to thermal barrier coatings occurs when the molten CMAS infiltrates the thermal barrier coating. After infiltration and upon cooling, the molten CMAS, or other molten contaminant composition, solidifies. The stress build up in the thermal barrier coating is sufficient to cause spallation of the coating material and loss of the thermal protection that it provides to the underlying part.

There is a need to reduce or prevent the damage to thermal barrier coatings caused by the reaction or infiltration of molten contaminant compositions at the operating temperature of the engine. This can be accomplished by covering the thermal barrier coating with an impermeable barrier that prevents liquid contaminant compositions when they form on the hot surfaces of thermal barrier coated parts from reacting or flowing into the thermal barrier coating.

SUMMARY OF THE INVENTION

The present invention satisfies this need by providing a composite comprising a thermal barrier coating on a part with a continuous impermeable barrier coating on the outer surface of the thermal barrier coating. The invention also includes a protected thermal barrier coated part comprising a part with a thermal barrier coating on said part and a single protective layer of an impermeable barrier coating on an outer surface of said thermal barrier coating. The composite thermal barrier coating according to the present invention also comprises a substrate with a thermal barrier coating, an impermeable barrier coating, and when needed a bond coat between the substrate and the thermal barrier coating.

Environmental contaminants are materials that exist in the environment and are ingested into engines, from air and fuel sources, and impurities and oxidation products of engine components, such as iron oxide.

The term "operating temperature" means the surface temperature of the thermal barrier coating during its operation in a given application, such as a gas turbine engine. Such temperatures are above room temperature, and generally are above 500° C. High temperature operation of thermal barrier coating parts is usually above about 1000° C.

DESCRIPTION OF THE INVENTION

It has been discovered that the degradation of thermal barrier coatings by environmental contaminants that form molten contaminant compositions can be prevented by a composite having an impermeable barrier coating that is dense and non-cracked on the surface of a thermal barrier coated part. A composite with an impermeable barrier coating inhibits degradation of the thermal barrier coating when in contact with liquid contaminant compositions at operating temperatures of the thermal barrier coated part.

In accordance with this invention, infiltration or viscous flow of the contaminant composition into thermal barrier coating cracks, openings, and pores is prevented. The composite of this invention also protects the thermal barrier coating from dissolution or spallation due to chemical and mechanical attack by the contaminant composition. The liquid contaminant composition is unable to penetrate the impermeable coating, and therefore is unable to attack the thermal barrier coating. The barrier coating enhances the life of the thermal barrier coated part and thus, reduces thermal barrier coated part failure.

Sources of environmental contaminants include, but are not limited to, sand, dirt, volcanic ash, fly ash, cement, runway dust, substrate impurities, fuel and air sources, oxidation products from engine components, and the like. The environmental contaminants adhere to the surfaces of thermal barrier coated parts. At the operating temperatures of the thermal barrier coating, the environmental contaminants then form contaminant compositions on surfaces of the thermal barrier coating which may have melting ranges or temperatures at or below the operating temperature.

In addition, the environmental contaminant may include magnesium, calcium, aluminum, silicon, chromium, iron, nickel, barium, titanium, alkali metals, and compounds thereof, to mention a few. The environmental contaminants may be oxides, phosphates, carbonates, salts, and mixtures thereof.

The chemical composition of the contaminant composition corresponds to the composition of the environmental contaminants from which it is formed. For example, at operational temperatures of about 1000° C. or higher, the contaminant composition corresponds to compositions of calcium-magnesium-aluminum-silicon oxide systems or CMAS. Generally, the environmental contaminant compositions known as CMAS comprise primarily a mixture of magnesium oxide (MgO), calcium oxide (CaO), aluminum oxide (Al2O3), and silicon oxide (SiO2). Other elements, such as nickel, iron, titanium, and chromium, may be present in the CMAS in minor amounts when these elements or their compounds are present in the environmental contaminants. A minor amount is an amount less than about ten weight percent of the total amount of contaminant composition present.

The protective coating of this composite can be described as impermeable or impervious in that it prevents the liquid contaminant composition from contacting the thermal barrier coating so that chemical or physical changes of the thermal barrier coating do not occur due to infiltration or reaction with the contaminant composition. Thus, the character of the protective coating is dense and non-penetratable. The result is that infiltration of the contaminant composition, e.g., liquid CMAS, into the thermal barrier coating at operating temperatures of engines is eliminated or decreased.

Such an impermeable or impervious coating is a ceramic or metal outer coating, deposited on the outer surface of the thermal barrier coating. The impermeable coating acts as a barrier between the thermal barrier coating and the contaminant eutectic mixture; it is dense and non-porous.

Impermeable barrier coatings can be various oxides; non-oxides such as carbides, silicides, and nitrides; and metals that form non-porous deposits. The metal oxide coating may be selected from the group consisting of silicon oxide, tantalum oxide, scandium oxide, aluminum oxide, hafnium oxide, zirconium oxide, calcium zirconate, and spinels, such as magnesium aluminum oxide, and mixtures thereof. The metal carbide coating may be selected from the group consisting of silicon carbide, tantalum carbide, titanium carbide, tungsten carbide, silicon oxycarbide, and mixtures thereof. The metal nitride coating may be selected from the group consisting of silicon nitride, zirconium nitride, tantalum nitride, boron nitride, and mixtures thereof. The metal silicide may be selected from the group consisting of chromium silicide, molybdenum silicide, tantalum silicide, titanium silicide, tungsten silicide, zirconium silicide, and mixtures thereof. Noble metals that are suitable for coatings can include platinum, palladium, silver, gold, ruthenium, rhodium, iridium, and alloys thereof, such as 80 weight percent palladium-20 weight percent silver.

Impermeable barrier coatings that are especially effective are a palladium-silver alloy, in particular about 80 weight % palladium-20 weight % silver, palladium, platinum, silicon carbide, silicon oxide, tantalum oxide, calcium zirconate, magnesium aluminum oxide, silicon oxycarbide, and mixtures thereof.

An effective amount of an impermeable barrier coating is an amount needed to inhibit the contaminant composition from penetrating an opening in the thermal barrier coating. The thickness of the impermeable barrier coating is determined by such considerations as: the application and design of the thermal barrier coated part, the amount and composition of the contaminant composition that is encountered during service, the operating temperature of the thermal barrier coating, and the locality and geographical limitations where the thermal barrier coated part will be used.

In selecting an impermeable barrier coating, the surface temperature of the thermal barrier coating during its operation needs to be considered, as well as the type and composition of the environmental contaminants that will be encountered. It is contemplated that the impermeable barrier coating will have a melting temperature above the operating temperature of the thermal barrier coating. For instance, if the surface of the thermal barrier coating is about 1200° C. during operation, than the impermeable barrier coating needs to have a melting temperature above 1200° C.

The impermeable barrier coating can be deposited on the thermal barrier coating by coating methods known in the art, such as sol-gel, sputtering, air plasma spray, organo-metallic chemical vapor deposition, physical vapor deposition, chemical vapor deposition, and the like. The choice of the coating method in part depends on where and how the thermal barrier coated part will be used and the desired thickness for such use. In selecting a method of deposition, a practitioner should look at the criticality of the thickness requirement for the coating. Both thick and thin coatings should be dense and as pore-free as possible.

Thicknesses of the impermeable barrier coating can vary from about 0.2 micrometers to about 250 micrometers. The preferred thickness is about 2–125 micrometers. The thickness of the impermeable coating is also in part, determined by the operating temperature of the thermal barrier coating and the amount and composition of the contaminant. If thick impermeable barrier coatings are required, i.e., about 125 micrometers or more, a compositionally graded deposit can be used to keep internal stresses minimized in order that delamination of the impermeable coating does not occur.

For purposes of illustrating the use of a specific impermeable barrier coating in the composite, as well as imparting an understanding of the present invention, the reaction of CMAS composition with the impermeable coating on a thermal barrier coating is described at operating temperatures of about 1200° C. or higher.

The chemical composition of the CMAS composition was determined by electron microprobe analysis of infiltrated deposits found on thermal barrier coated engine parts where deposit-induced damage to the thermal barrier coating had been observed. Analysis indicated that 127 micron (5 mils) of CMAS-like deposits (~34 mg/cm$^2$ assuming a density of 2.7 g/cm$^3$) can form on thermal barrier coating surfaces. The CMAS deposits evaluated were typically in the compositional range (weight %): 5–35% CaO, 2–35% MgO, 5–15% Al$_2$O$_3$, 5–55% SiO$_2$, 0–5% NiO, 5–10% Fe$_2$O$_3$, however the content of the ubiquitous Fe$_2$O$_3$ can be as large as 75 wt %. An average composition for such deposits (weight %: 28.7% CaO, 6.4% MgO, 11.1% Al$_2$O$_3$, 43.7% SiO$_2$, 1.9% NiO, 8.3% Fe$_2$O$_3$) was synthesized in the laboratory and used as a standard CMAS for the purpose of evaluating protective coatings. Differential thermal analysis of actual CMAS deposits and the synthesized CMAS indicated that the onset of melting occurs at about 1190° C. with the maximum of the melting peak occurring at about 1260° C. Thermal testing of candidate protective coatings for thermal barrier coatings against the laboratory synthesized CMAS composition were carried out at about 1260° C.

The following examples further serve to describe the invention.

EXAMPLES

Composites with impermeable barrier coatings on thermal barrier coated components were investigated to prevent the infiltration of environmentally deposited mixtures of oxides of calcium, magnesium, aluminum, and silicon (CMAS).

Candidate composite impermeable barrier coating compositions were deposited on thermal barrier coatings of 8 weight percent yttria-92 weight percent zirconia and assessed for CMAS infiltration resistance using metallography, SEM and electron microprobe chemical analysis. The above testing was conducted under laboratory furnace test conditions (isothermal). Thermal barrier coated parts with impermeable barrier coatings were found to minimize CMAS infiltration and damage under isothermal conditions.

Impermeable barrier coatings that were deposited by the sol-gel, air plasma spray, sputtering, and MOCVD methods were: an 80/20 weight percent palladium-silver film, palladium, platinum, silicon carbide, silicon oxide, scandia, silicon oxycarbide, tantalum oxide, calcium zirconate, and magnesium aluminum oxide.

The effectiveness of protective coatings in preventing CMAS-infiltration-induced thermal barrier coating damage was tested by comparing the infiltration resistance of protected and non-protected thermal barrier coated substrates which were thermally cycled in the presence of surface deposits of CMAS. In these experiments, 8 mg/cm$^2$ of ground pre-reacted CMAS was deposited on masked areas of the thermal barrier coated substrates. A thermal cycle consisted of heating the samples to 1260° C. in 10 minutes, holding it at 1260° C. for 10 minutes, followed by cooling it to room temperature in 30 minutes. After each cycle the samples were inspected with the unaided eye and at 50× using a stereo microscope. This cycle was repeated several times. After completion of thermal testing, the samples were sectioned, metallographically polished, and inspected using bright field and dark field optical microscopy.

Example 1

Example 1 demonstrates the effect of CMAS on a thermal barrier coated part without an impermeable barrier coating. Non-protected thermal barrier coating samples tested in the above-mentioned fashion exhibit visible CMAS induced thermal barrier coating swelling and cracking (visible on sample edges under the stereomicroscope). Metallographic preparation and inspection of the non-protected samples shows CMAS induced thermal barrier coating densification, cracking and exfoliation.

Example 2

A thick film (125 micrometers) of 80 weight percent palladium-20 weight percent silver was deposited by thick film screen printing of electrode paste on an 8 weight % yttria-stabilized 92 weight % zirconia coated coupon. The palladium-silver coating formed a dense, continuous film without voids after heat treatment. The palladium-silver coating partially melted and flowed into the top surface of the thermal barrier coating, providing good adhesion to the substrate. The palladium-silver film filled and bridged the thermal barrier coating microcracks.

Eight mg/cm$^2$ CMAS was deposited on the above impermeable coated samples and tested isothermally at 1260° C. for ten minutes. The CMAS was retained on the top surface of the palladium/silver film. There were no apparent CMAS induced thermal barrier coating delamination cracks.

Example 3

Microprobe analysis of a CMAS-spinel diffusion couple indicated that there was no reaction between the CMAS and a spinel coating, magnesium aluminum oxide. Therefore, magnesium aluminum oxide, was deposited on thermal barrier coated coupons using air plasma spray, sol-gel and metallic organic chemical vapor deposition techniques. Eight mg/cm$^2$ CMAS was deposited on the above impermeable coated samples. Thermal cycling took place to 1260° C. The thermal barrier coating had no edge cracks in the CMAS application area at 20–50× view and limited CMAS infiltration in the cross-section.

Example 4

Calcium zirconate was deposited on thermal barrier coated coupons by sol-gel, air plasma spray, sputtering, and metallic organic chemical vapor deposition. The air plasma spray calcium zirconate coating was 125 micrometers thick and graded to accommodate an expansion mismatch. Eight mg/cm$^2$ CMAS was deposited on the above impermeable coated samples. Heat cycling took place to 1260° C. Metallography showed that the CMAS was retained on top of impermeable barrier.

Example 5

The above air plasma spray deposition of 125 micrometers (graded) of calcium zirconate on thermal barrier coated coupons was performed. An additional 125 micrometers of calcium zirconate was then air plasma sprayed on the previous graded calcium zirconate deposit. Eight mg/cm$^2$ CMAS was deposited on the above impermeable coated samples. Heat cycling took place to 1260° C. Metallography showed that the CMAS was retained on top of impermeable barrier.

The practice of this invention makes it possible to extend the effective life of gas turbine engine thermal barrier coatings at a specific set of operating parameters including operating temperature and operating environment. It also provides a means to provide for engine designs which impose increased thermal burdens on thermal barrier coatings such as reduced cooling of thermal barrier coated parts or exposure of such parts to higher temperature input, i.e., effective increase of operating temperatures for the engine system. Accordingly, the practice of this invention provides for substantial enhancement of the functions of currently available thermal barrier coatings under more rigorous thermal assault as demands for performance escalate.

What is claimed:

1. A composite comprising a porous thermal barrier coating on a part with a continuous impermeable barrier coating adjacent to an outer surface of the thermal barrier coating where said impermeable barrier coating is dense and non-porous and where the impermeable barrier coating is about 0.2–250 micrometers thick and where said impermeable barrier coating is selected from the group consisting of tantalum oxide, scandium oxide, hafnium oxide, magnesium aluminum oxide, calcium zirconate, silicon carbide, tantalum carbide, titanium carbide, tungsten carbide, silicon oxycarbide, silicon nitride, zirconium nitride, tantalum nitride, boron nitride, chromium silicide, molybdenum silicide, tantalum silicide, titanium silicide, tungsten silicide, zirconium silicide, silver, gold, and alloys thereof.

2. A composite according to claim 1 where the thermal barrier coating is a chemically stabilized zirconia selected from the group consisting of yttria-stabilized zirconia, scandia-stabilized zirconia, calcia-stabilized zirconia, and magnesia-stabilized zirconia.

3. A composite according to claim 1 where the part is an alloy selected from the group consisting of nickel based alloys, cobalt based alloys, iron based alloys, and mixtures thereof.

4. A protected thermal barrier coated part comprising a part selected from the group consisting of nickel based alloys, cobalt based alloys, iron based alloys, and mixtures thereof, with a porous thermal barrier coating selected from the group consisting of a chemically stabilized zirconia selected from the group consisting of yttria-stabilized zirconia, scandia-stabilized zirconia, calcia-stabilized zirconia, and magnesia-stabilized zirconia, on said part and a dense and non-porous impermeable barrier coating selected from the group consisting of tantalum oxide, scandium oxide, hafnium oxide, magnesium aluminum oxide, calcium zirconate, silicon carbide, tantalum carbide, titanium carbide, tungsten carbide, silicon oxycarbide, silicon nitride, zirconium nitride, tantalum nitride, boron nitride, chromium silicide, molybdenum silicide, tantalum silicide, titanium silicide, tungsten silicide, zirconium silicide, silver, gold, and alloys thereof, in an amount of about 0.2–250 micrometers thick on an outer surface of said thermal barrier coating.

5. An article of manufacture for use in gas turbine engines comprising a part having a surface covered with a porous thermal barrier coating, where the porous thermal barrier coating is selected from the group consisting of yttria-stabilized zirconia, scandia-stabilized zirconia, calcia-stabilized zirconia, and magnesia-stabilized zirconia, and said thermal barrier coating having an outer surface covered with a dense and non-porous impermeable barrier coating in an amount of about 0.2–250 micrometers, where the dense and non-porous impermeable barrier coating is selected from the group consisting of tantalum oxide, scandium oxide, hafnium oxide, magnesium aluminum oxide, calcium zirconate, silicon carbide, tantalum carbide, titanium carbide, tungsten carbide, silicon oxycarbide, silicon nitride, zirconium nitride, tantalum nitride, boron nitride, chromium silicide, molybdenum silicide, tantalum silicide, titanium silicide, tungsten silicide, zirconium silicide, silver, gold, and alloys thereof.

* * * * *